US012280876B2

(12) United States Patent
Murnan

(10) Patent No.: US 12,280,876 B2
(45) Date of Patent: Apr. 22, 2025

(54) PASSENGER SEAT HEADREST WITH ADJUSTABLE HINGE

(71) Applicant: Safran Seats USA LLC, Gainesville, TX (US)

(72) Inventor: Justin K. Murnan, Whitesboro, TX (US)

(73) Assignee: Safran Seats USA LLC, Gainesville, TX (US)

( * ) Notice: Subject to any disclaimer, the term of this patent is extended or adjusted under 35 U.S.C. 154(b) by 19 days.

(21) Appl. No.: 17/956,434

(22) Filed: Sep. 29, 2022

(65) Prior Publication Data

US 2024/0059416 A1 Feb. 22, 2024

Related U.S. Application Data

(60) Provisional application No. 63/398,411, filed on Aug. 16, 2022.

(51) Int. Cl.
| | |
|---|---|
| *A47C 7/36* | (2006.01) |
| *B60N 2/806* | (2018.01) |
| *B64D 11/06* | (2006.01) |
| *E05D 11/10* | (2006.01) |

(52) U.S. Cl.
CPC .......... *B64D 11/0642* (2014.12); *B60N 2/806* (2018.02)

(58) Field of Classification Search
CPC ........ B60N 2/885; B60N 2/844; B60N 2/812; B60N 2/815; B60N 2/818; E05D 11/06; E05D 3/00; E05D 3/02
See application file for complete search history.

(56) References Cited

U.S. PATENT DOCUMENTS

| | | | | |
|---|---|---|---|---|
| 2,267,103 A | * | 12/1941 | Ireland | B60N 2/885 297/410 |
| 3,029,107 A | * | 4/1962 | Myers | B60N 2/882 297/399 |
| 3,825,973 A | * | 7/1974 | Gwozdz | E05F 1/1215 16/300 |
| 4,490,884 A | * | 1/1985 | Vickers | E05D 11/082 16/338 |
| 5,173,993 A | * | 12/1992 | Baker | E05D 11/087 16/329 |

(Continued)

FOREIGN PATENT DOCUMENTS

| | | |
|---|---|---|
| CN | 208393194 U | 1/2019 |
| CN | 110001488 A | 7/2019 |

(Continued)

OTHER PUBLICATIONS

European Application No. 23188115.2, Extended European Search Report mailed on Dec. 6, 2023, 9 pages.

*Primary Examiner* — Shin H Kim
(74) *Attorney, Agent, or Firm* — Kilpatrick Townsend & Stockton LLP

(57) ABSTRACT

A passenger seat headrest may be provided for a passenger seat such as but not limited to an aircraft passenger seat. The passenger seat headrest includes a main portion, a wing, and a hinge connecting the wing with the main portion such that the wing is movable relative to the main portion about at least one axis. The hinge is adjustable such that a resistance to rotation of the wing relative to the main portion is adjustable.

16 Claims, 6 Drawing Sheets

(56) References Cited

U.S. PATENT DOCUMENTS

| | | | | |
|---|---|---|---|---|
| 8,707,518 B2* | 4/2014 | Branning | | E05D 11/00 |
| | | | | 16/385 |
| 8,911,020 B2* | 12/2014 | Westerink | | B60N 2/885 |
| | | | | 297/406 |
| D816,460 S * | 5/2018 | Branning | | D8/328 |
| D837,027 S * | 1/2019 | Christensen | | D8/323 |
| 10,329,814 B1* | 6/2019 | Tamer | | E05D 11/1007 |
| 10,336,230 B2* | 7/2019 | Novin | | F16C 11/103 |
| 10,458,165 B1* | 10/2019 | Tsai | | E05D 7/04 |
| 10,538,185 B2* | 1/2020 | Novin | | F16C 29/02 |
| 10,589,651 B2* | 3/2020 | Nakamura | | B60N 2/885 |
| 10,960,801 B2* | 3/2021 | Novin | | B60N 2/85 |
| 11,396,251 B2* | 7/2022 | Clough | | B60N 2/242 |
| 11,659,935 B2* | 5/2023 | Miller | | A47C 16/00 |
| | | | | 297/391 |
| 2006/0043776 A1* | 3/2006 | Rajasingham | | B60N 2/42736 |
| | | | | 180/271 |
| 2012/0124776 A1* | 5/2012 | McDonnell | | E05D 11/06 |
| | | | | 16/375 |
| 2013/0104345 A1* | 5/2013 | Granberry | | E05D 11/06 |
| | | | | 16/374 |
| 2014/0173852 A1* | 6/2014 | Heninger | | E05D 5/14 |
| | | | | 16/375 |
| 2017/0340125 A1* | 11/2017 | Miller | | A47C 16/00 |
| 2018/0105087 A1* | 4/2018 | Novin | | B60N 2/885 |
| 2018/0319302 A1* | 11/2018 | Novin | | F16C 29/02 |
| 2019/0046375 A1* | 2/2019 | Culver | | E05D 5/128 |
| 2019/0186186 A1* | 6/2019 | Tamer | | E05D 11/06 |
| 2019/0226255 A1* | 7/2019 | Fields | | E05D 9/00 |
| 2020/0063479 A1* | 2/2020 | Klassen | | E05D 5/14 |
| 2020/0122618 A1* | 4/2020 | Novin | | B60N 2/844 |

FOREIGN PATENT DOCUMENTS

| | | |
|---|---|---|
| FR | 2990658 A1 | 11/2013 |
| JP | 57158128 A | 9/1982 |
| WO | 2009020439 A1 | 2/2009 |

* cited by examiner

PASSENGER SEAT HEADREST WITH ADJUSTABLE HINGE

REFERENCE TO RELATED APPLICATION

This application claims the benefit of U.S. Provisional Patent Application No. 63/398,411, filed on Aug. 16, 2022 and entitled PASSENGER SEAT HEADREST WITH ADJUSTABLE HINGE, the content of which is hereby incorporated by reference in its entirety.

FIELD OF THE INVENTION

The field of the invention relates to passenger seats for passenger vehicles such as aircraft, and more particularly to headrests for passenger seats.

BACKGROUND

Passenger seats, such as those provided on aircraft, trains, vehicles, and the like, often include components that are hinged together. As an example, a headrest for a passenger seat may include a center portion and wings, and the wings are attached to the center portion via a hinge such that the wings are movable relative to the center portion. Traditional headrests and hinges on such headrests do not allow for any adjustments to be made to the hinges. In such cases, when the hinge connecting the wing to the center portion is loose or worn out over time, the headrest must be disassembled such that the old hinge is replaced with a new hinge.

SUMMARY

The terms "invention," "the invention," "this invention" and "the present invention" used in this patent are intended to refer broadly to all the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat headrest for a passenger seat includes a main portion, a wing, and a hinge connecting the wing with the main portion such that the wing is movable relative to the main portion about at least one axis. The hinge is adjustable such that a resistance to rotation of the wing relative to the main portion is adjustable.

In some embodiments, the hinge includes a first hinge piece, a second hinge piece, and an adjuster connecting the first hinge piece with the second hinge piece. The adjuster may define a pivot axis for the hinge as the at least one axis, and the first hinge piece is movable relative to the second hinge piece about the pivot axis.

The first hinge piece may include a connecting portion, and the second hinge piece may include a first ear overlapping a first end of the connecting portion and a second ear overlapping a second end of the connecting portion.

In various embodiments, the adjuster extends through the first ear and the connecting portion.

In some embodiments, the adjuster includes a body and a head, the body extends through the first ear and the second portion, and the first ear is on the body of the adjuster between the connecting portion of the first hinge piece and the head of the adjuster.

The passenger seat headrest may include a first spacer between the first ear and the first end of the connecting portion, and a second spacer between the second ear and the second end of the connecting portion. The adjuster may extend through the first spacer and the second spacer.

In certain embodiments, the first hinge piece is connected to the main portion and the second hinge piece is connected to the wing, or the first hinge piece is connected to the wing and the second hinge piece is connected to the main portion.

The hinge may be adjustable between a tightened configuration and a loosened configuration.

In some embodiments, the hinge includes an adjuster for adjusting the resistance to rotation of the wing relative to the main portion, and the adjuster extends outwards from the hinge along the at least one axis.

In various examples, the adjuster extends outwards in a downwards direction from the hinge.

The passenger seat headrest may include a dress cover covering the main portion and the wing, and the hinge may be adjustable without removing the dress cover from the main portion and the wing.

In certain embodiments, the hinge optionally includes a rotation limiter.

In various embodiments, the hinge includes a first hinge piece with a connecting portion and a second hinge piece comprising a first ear and a second ear, and the first each and the second ear overlapping the connecting portion along the at least one axis. The hinge may include an adjuster connecting the first hinge piece with the second hinge piece. The adjuster may adjust the resistance to rotation of the wing relative to the main portion by adjusting a clamping force of the first ear and the second ear on the connecting portion.

In some embodiments, the adjuster extends outwards from the first ear or the second ear along the at least one axis.

In some examples, the passenger seat headrest includes a first spacer between the first ear and the connecting portion along the at least one axis and a second spacer between the second ear and the connecting portion along the at least one axis.

According to certain embodiments of the present invention, a passenger seat headrest includes a hinge with a first hinge portion connectable to a main portion of the passenger seat headrest and a second hinge portion connectable to a wing of the passenger seat headrest. The second hinge portion is movable relative to the first hinge portion about a pivot axis. In some embodiments, a resistance to rotation of the second hinge portion relative to the first hinge portion is adjustable.

In various embodiments, the passenger seat headrest includes the main portion of the passenger seat headrest and the wing portion of the passenger seat headrest.

In some embodiments, the hinge includes an adjuster for adjusting the resistance to rotation, and the adjuster extends outwards from the first hinge portion and the second hinge portion along the pivot axis.

According to certain embodiments of the present invention, a passenger seat headrest includes a hinge for connecting a main portion of the passenger seat headrest with a wing portion of the passenger seat headrest. The hinge includes a first hinge piece with a connecting portion and a second hinge piece with a first ear and a second ear, where the first each and the second ear overlapping the connecting portion along a pivot axis. The hinge also includes an adjuster connecting the first hinge piece with the second hinge piece. The adjuster may adjust a resistance to rotation of the first hinge piece relative to the second hinge piece about the pivot axis by adjusting a clamping force of the first ear and the second ear on the connecting portion.

In various embodiments, the adjuster extends outwards from the first ear or the second ear along the pivot axis, and the hinge additionally includes a first spacer between the first ear and the connecting portion along the pivot axis and a second spacer between the second ear and the connecting portion along the pivot axis.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any order or arrangement among or between various steps or elements except when the order of individual steps or arrangement of elements is explicitly described.

The described embodiments of the invention provide passenger seat headrests with adjustable hinges for passenger seats. While the passenger seat headrests are discussed for use with aircraft seats, they are by no means so limited. Rather, embodiments of the passenger seat headrests described herein may be used in passenger seats or other seats of any type or otherwise as desired.

Figure 1:
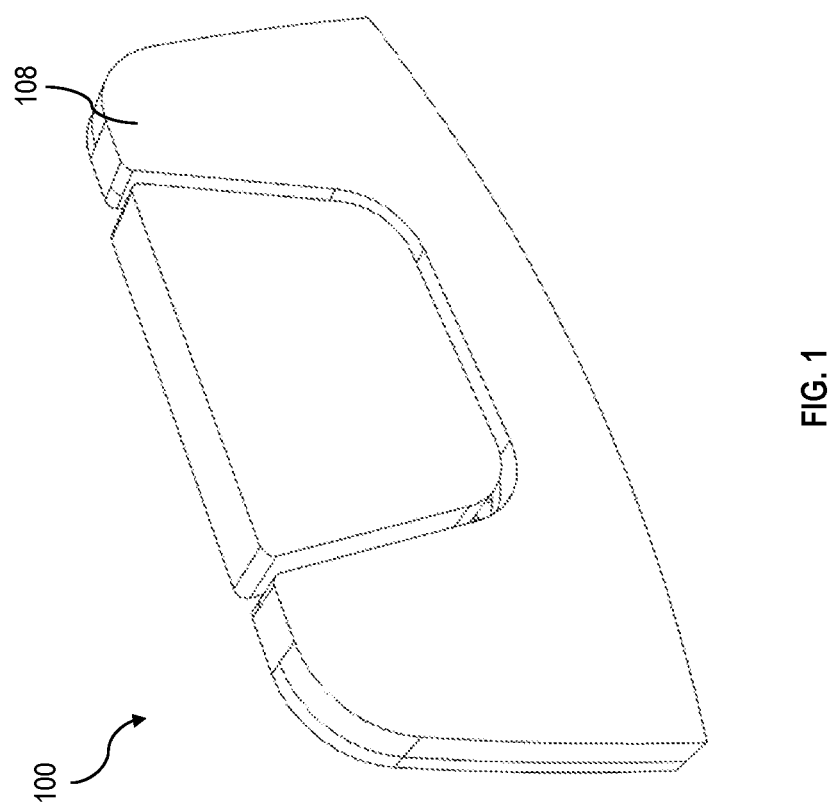
FIG. 1 is a perspective view of a passenger seat headrest for a passenger seat according to embodiments.
Figure 2:
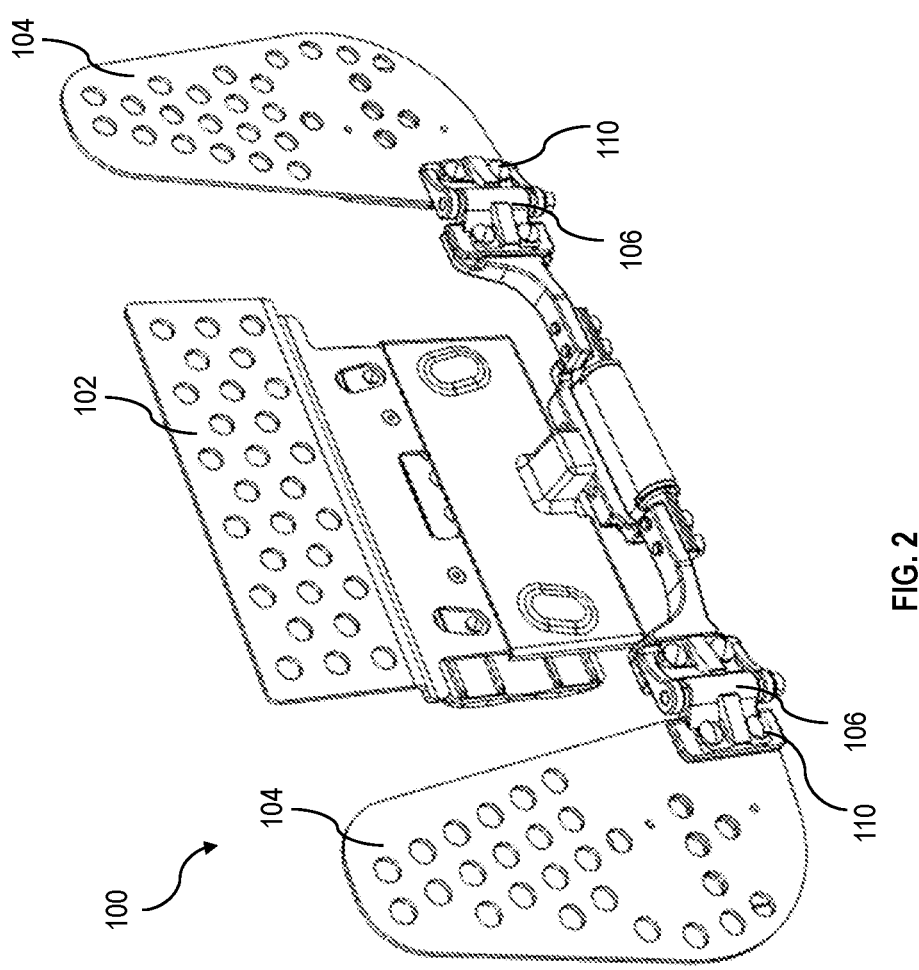
FIG. 2 is a perspective view of the passenger seat headrest of FIG. 1 with a dress cover removed.
Figure 3:
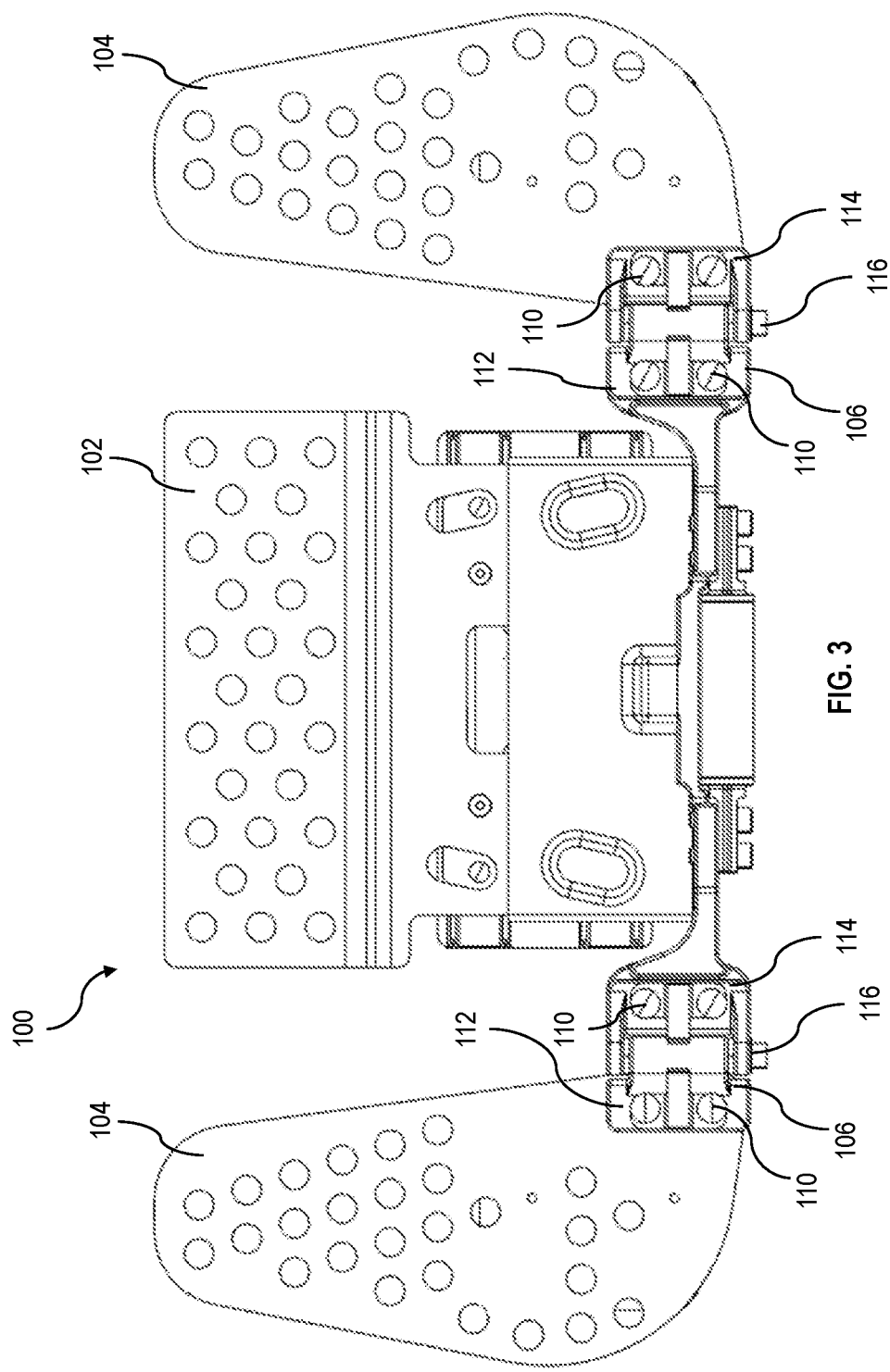
FIG. 3 is a front view of the passenger seat headrest of FIG. 1 with the dress cover removed.
Figure 5:
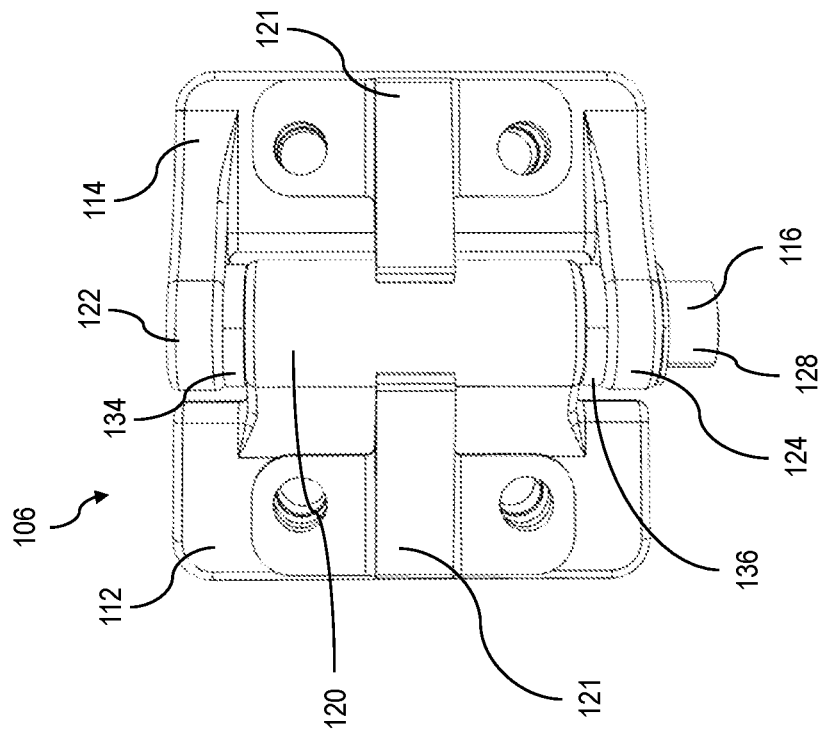
FIG. 5 is a front view of the hinge of FIG. 4.
Figure 4:
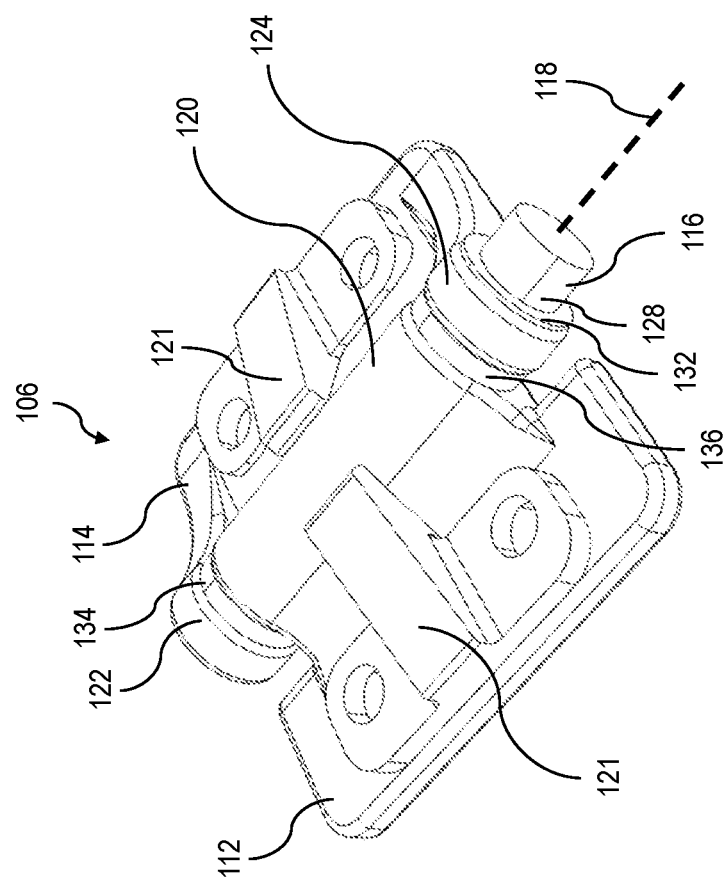
FIG. 4 is a perspective view of a hinge of the passenger seat headrest of FIG. 1 according to embodiments.
Figure 7:
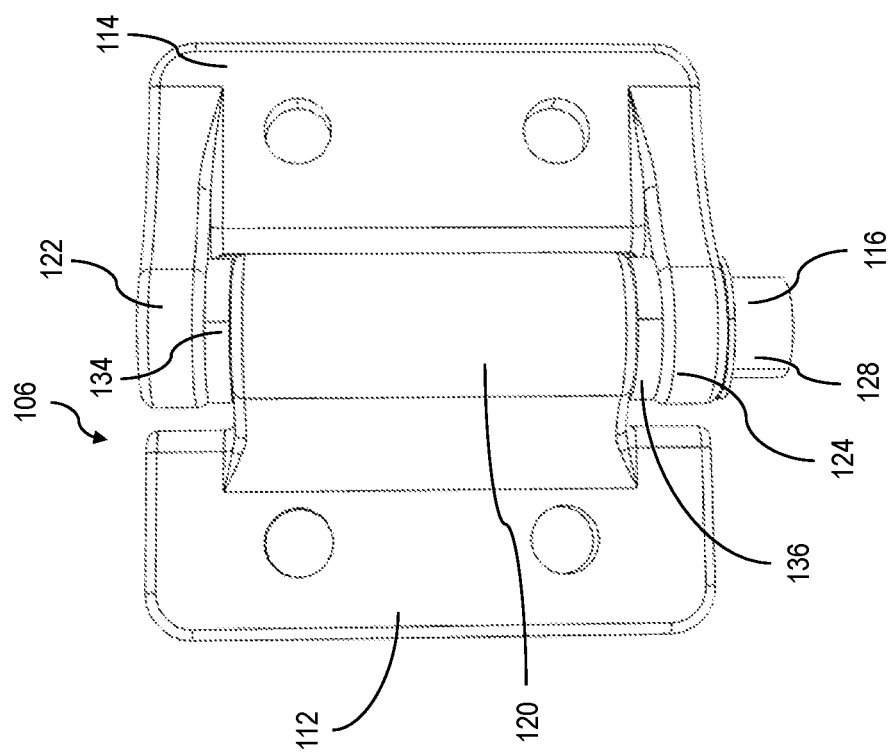
FIG. 7 is a front view of the hinge of FIG. 4 with rotation limiters removed.
Figure 6:
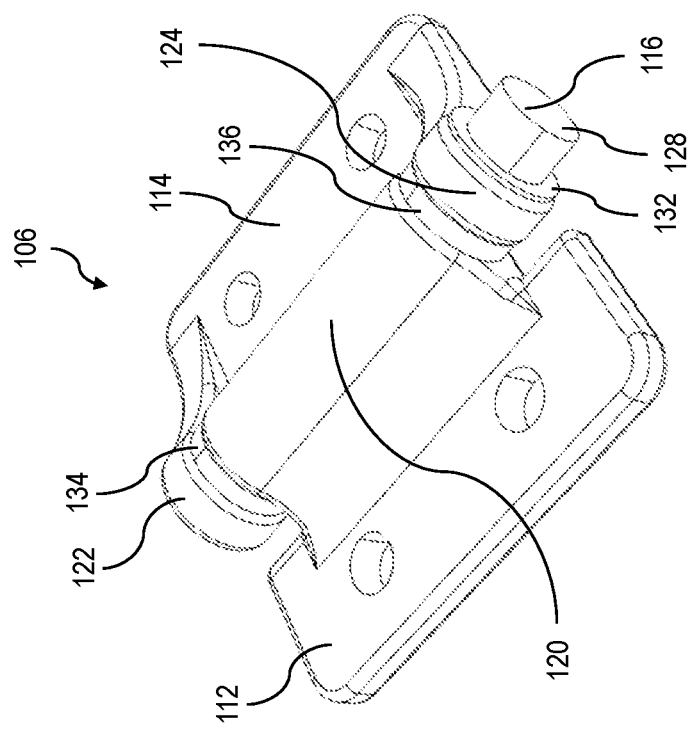
FIG. 6 is a perspective view of the hinge of FIG. 4 with rotation limiters removed.

FIGS. 1-3 illustrate an example of a passenger seat headrest 100 according to embodiments. The passenger seat headrest 100 may be generally supported on a passenger seat, such as but not limited to an aircraft passenger seat, using various techniques or mechanisms as desired. Referring to FIGS. 2 and 3, the passenger seat headrest 100 generally includes a main portion 102 and one or more wings 104. While two wings 104 are illustrated in FIGS. 2 and 3, the number of wings should not be considered limiting, and in other embodiments, the passenger seat headrest 100 may include a single wing 104 or a plurality of wings 104. The wings 104 may be pivotably attached to the main portion 102 (and/or to each other when a plurality of wings is provided on a side of the main portion 102) such that the wings 104 are movable relative to the main portion 102 about at least one axis. Cushioning may be supported on the main portion 102 and wings 104, and a dress cover 108 forming an outermost surface of the passenger seat headrest 100 (e.g., a surface that a passenger may contact her or his head) may be provided on the main portion 102 and wings 104.

In certain embodiments, a hinge 106 may pivotably connect each wing 104 with the main portion 102 and/or to each other. In some embodiments, a plurality of hinges 106 may connect each wing 104 with the main portion 102. Each hinge 106 may be connected to the wing 104 and the main portion 102 using various components or features as desired, including but not limited to mechanical fasteners 110. The number of mechanical fasteners 110 illustrated for each hinge 106 should not be considered limiting, and in other embodiments, devices and/or mechanisms other than mechanical fasteners may be utilized to connect the hinge 106 to each of the main portion 102 and the particular wing 104.

As best illustrated in FIGS. 4-10, each hinge 106 generally includes a first hinge portion 112 and a second hinge portion 114. An adjuster 116 connects the first hinge portion 112 with the second hinge portion 114 and defines a pivot axis 118 such that the first hinge portion 112 (and any component of the of the passenger seat headrest 100 attached thereto) may be positionable relative to the second hinge portion 114 (and any component of the passenger seat headrest 100 attached thereto) about the pivot axis 118. When assembled, the first hinge portion 112 may be connected to the main portion 102 or the particular wing 104, and the second hinge portion 114 may be connected to the other of the main portion 102 or the particular wing 104.

Figure 10:
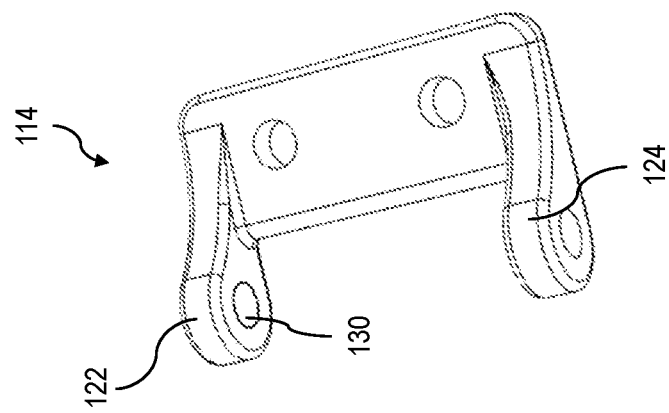
FIG. 10 illustrates the second hinge portion of the hinge of FIG. 4.

The first hinge portion 112 includes a connecting portion 120, and the second hinge portion 114 includes a first ear 122 and a second ear 124. The hinge includes an anchoring member 130 (see FIG. 10) for engaging the adjuster 116. In some embodiments, the anchoring member 130 may be provided within one of the ears of the second hinge portion 114, such as the first ear 122 as illustrated in FIG. 10. In other embodiments, the anchoring member 130 may be provided within the second ear 124 and/or within the connecting portion 120 of the first hinge portion 112. When assembled, the connecting portion 120 and the ears 122, 124 may be generally aligned along the pivot axis 118 such that the connecting portion 120 is between the ears 122, 124.

Figure 9:
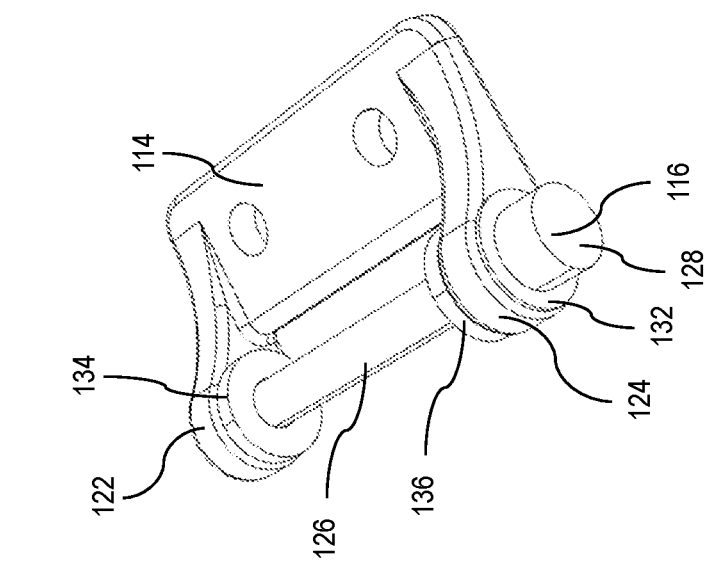
FIG. 9 is a perspective view of a second hinge portion and the adjuster of the hinge of FIG. 4.
Figure 8:
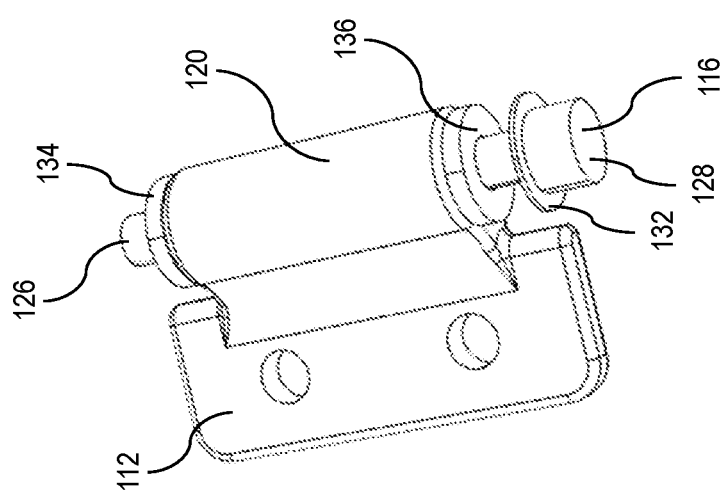
FIG. 8 is a perspective view of a first hinge portion and an adjuster of the hinge of FIG. 4.

As best illustrated in FIGS. 8 and 9, the adjuster 116 includes a body 126 and a head 128. In certain embodiments, the body 126 of the adjuster extends through one of the ears 122, 124 and at least partially through the connecting portion 120. In embodiments where the anchoring member 130 is provided within the first ear 122, the body 126 may extend through the second ear 124, through the connecting portion 120, and into engagement with the anchoring member 130. Optionally, the body 126 may threadably engage the anchoring member 130 (e.g., via threading on the body 126 and/or the anchoring member 130, although other types of engagement may be utilized as desired. In embodiments where the anchoring member 130 is provided within the connecting portion, the hinge 106 may include two adjusters 116—one adjuster 116 that extends through the first ear 122 and at least partially into engagement with the anchoring member 130 and another adjuster 116 that extends through the second ear 124 and at least partially into the connecting portion 120 and into engagement with the anchoring member 130. The adjuster 116 extending through the portions of the first hinge portion 112 and the second hinge portion 114 and into engagement with the anchoring member 130 may pivotably connect the hinge portions 112, 114. As discussed in detail below, the adjuster 116 may be adjusted to control and/or adjust a resistance to rotation between the first hinge portion 112 and the second hinge portion 114.

The head 128 of the adjuster 116 extends outwards from the second hinge portion 114, and when assembled, the first ear 122 (and/or the second ear 124) may be provided along the pivot axis 118 between the connecting portion 120 and the head 128. In some embodiments, and as illustrated in FIG. 3, the head 128 may extend outwards and downwardly from the hinge 106, although it need not in other examples. Optionally, the head 128 includes a stopper 132 for contacting the first ear 122 and/or the second ear 124 and limiting axial movement of the head 128. As discussed in detail below, the head 128 of the hinge 106 extending outwards from the hinge 106 allows for the adjuster 116 to be accessed without disassembling the entire passenger seat headrest 100.

Optionally, one or more first spacers 134 may be provided along the body 126 between the connecting portion 120 and the first ear 122, and one or more second spacers 136 may be provided along the body 126 between the connecting portion 120 and the second ear 124. When included the spacers 134, 136 may provide frictional engagement (e.g., resistance to rotation) between the first hinge portion 112 and the second hinge portion 114.

Optionally, rotation limiters 121 may be provided on the first hinge portion 112 and/or the second hinge portion 114 for limiting a range of movement or rotation of the first hinge portion 112 relative to the second hinge portion 114 (e.g., by engaging each other at a maximum pivot angle). In other embodiments, the rotation limiters 121 may be omitted and/or other types of rotation limiters may be utilized. Optionally, a biasing mechanism may be provided with the hinge 106 such that the hinge is biased towards a particular angular position, although in other embodiments (and as illustrated in FIGS. 4-10) the biasing mechanism may be omitted.

The adjuster 116 of the hinge 106 may adjust resistance to rotation between the first hinge mechanism 112 and the second hinge mechanism 114 by increasing and/or decreasing engagement with the anchoring member 130. As a non-limiting example, the adjuster 116 may increase engagement with the anchoring member 130 by tightening the adjuster 116. Increasing engagement and tightening of the adjuster 116 may cause the ears 122, 124 to provide an increased clamping force on the connecting portion 120, thereby providing increased resistance to rotation and/or a firmer connection between hinge portions 112, 114. Conversely, the adjuster 116 may decrease engagement with the engagement by loosening the adjuster 116. Decreasing engagement and loosening the adjuster 116 may decrease and/or eliminate the clamping force provided by the ears 122, 124 on the connecting portion 120, thereby providing decreased resistance to rotation and/or a looser connecting between hinge portions 112, 114.

The adjuster 116 may provide variable adjustment of the resistance to rotation as desired. As non-limiting examples, the adjuster 116 may adjust the resistance to rotation to provide a firmer connection between the hinge portions 112, 114 after the hinge 106 has become loosened or worn over time. Additionally, or alternatively, the adjuster 116 may adjust the resistance to rotation to provide a desired resistance as set by an operator, passenger, and/or otherwise desired.

The head 128 of the adjuster 116 extending outwards along the pivot axis 118 may allow for adjustment of the hinge 106 without removing any other items of the passenger seat headrest 100. As a non-limiting example, the adjuster 116 may extend outwards from the hinge 106 and downwards such that the head 128 is accessible through an opening or access location that may be already defined on a lower portion of the dress cover 108. The hinges 106 described herein thereby allow for improved access to the hinge 106 and improved adjustment and/or control of the hinge 106, which in turn may increase the service life of the hinge 106 and decreases costs otherwise associated with repairing and/or replacing a hinge. Various other benefits and advantages may be realized with the devices and methods provided herein, and the aforementioned advantages should not be considered limiting.

A collection of exemplary embodiments is provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A passenger seat headrest for a passenger seat comprising: a main portion; a wing; and a hinge connecting the wing with the main portion such that the wing is movable relative to the main portion about at least one axis, wherein the hinge is adjustable such that a resistance to rotation of the wing relative to the main portion is adjustable.

Illustration 2. The passenger seat headrest of any of the preceding or subsequent illustrations, wherein the hinge comprises: a first hinge piece; a second hinge piece; and an adjuster connecting the first hinge piece with the second hinge piece and defining a pivot axis for the hinge as the at least one axis, wherein the first hinge piece is movable relative to the second hinge piece about the pivot axis.

Illustration 3. The passenger seat headrest of any of the preceding or subsequent illustrations, wherein: the first hinge piece comprises a connecting portion; and the second hinge piece comprises a first ear overlapping a first end of the connecting portion and a second ear overlapping a second end of the connecting portion.

Illustration 4. The passenger seat headrest of any of the preceding or subsequent illustrations, wherein the adjuster extends through the first ear and the connecting portion.

Illustration 5. The passenger seat headrest of any of the preceding or subsequent illustrations, wherein the adjuster comprises a body and a head, wherein the body extends through the first ear and the second portion, and wherein the first ear is on the body of the adjuster between the connecting portion of the first hinge piece and the head of the adjuster.

Illustration 6. The passenger seat headrest of any of the preceding or subsequent illustrations, further comprising: a first spacer between the first ear and the first end of the connecting portion; and a second spacer between the second ear and the second end of the connecting portion, wherein the adjuster extends through the first spacer and the second spacer.

Illustration 7. The passenger seat headrest of any of the preceding or subsequent illustrations, wherein: the first hinge piece is connected to the main portion and the second hinge piece is connected to the wing; or the first hinge piece is connected to the wing and the second hinge piece is connected to the main portion.

Illustration 8. The passenger seat headrest of any of the preceding or subsequent illustrations, wherein the hinge is adjustable between a tightened configuration and a loosened configuration.

Illustration 9. The passenger seat headrest of any of the preceding or subsequent illustrations, wherein the hinge comprises an adjuster for adjusting the resistance to rotation of the wing relative to the main portion, and wherein the adjuster extends outwards from the hinge along the at least one axis.

Illustration 10. The passenger seat headrest of any of the preceding or subsequent illustrations, wherein the adjuster extends outwards in a downwards direction from the hinge.

Illustration 11. The passenger seat headrest of any of the preceding or subsequent illustrations, further comprising a dress cover covering the main portion and the wing, wherein the hinge is adjustable without removing the dress cover from the main portion and the wing.

Illustration 12. The passenger seat headrest of any of the preceding or subsequent illustrations, wherein the hinge further comprises a rotation limiter.

Illustration 13. The passenger seat headrest of any of the preceding or subsequent illustrations, wherein the hinge comprises: a first hinge piece comprising a connecting portion; a second hinge piece comprising a first ear and a second ear, the first each and the second ear overlapping the connecting portion along the at least one axis; and an adjuster connecting the first hinge piece with the second hinge piece, wherein the adjuster is configured to adjust the resistance to rotation of the wing relative to the main portion by adjusting a clamping force of the first ear and the second ear on the connecting portion.

Illustration 14. The passenger seat headrest of any of the preceding or subsequent illustrations, wherein the adjuster extends outwards from the first ear or the second ear along the at least one axis.

Illustration 15. The passenger seat headrest of any of the preceding or subsequent illustrations, further comprising a first spacer between the first ear and the connecting portion along the at least one axis and a second spacer between the second ear and the connecting portion along the at least one axis.

Illustration 16. A passenger seat headrest comprising a hinge, the hinge comprising a first hinge portion connectable to a main portion of the passenger seat headrest and a second hinge portion connectable to a wing of the passenger seat headrest, wherein the second hinge portion is movable relative to the first hinge portion about a pivot axis, and wherein a resistance to rotation of the second hinge portion relative to the first hinge portion is adjustable.

Illustration 17. The passenger seat headrest of any of the preceding or subsequent illustrations, further comprising the main portion of the passenger seat headrest and the wing portion of the passenger seat headrest.

Illustration 18. The passenger seat headrest of any of the preceding or subsequent illustrations, wherein the hinge further comprises an adjuster for adjusting the resistance to rotation, wherein the adjuster extends outwards from the first hinge portion and the second hinge portion along the pivot axis.

Illustration 19. A passenger seat headrest comprising a hinge for connecting a main portion of the passenger seat headrest with a wing portion of the passenger seat headrest, wherein the hinge comprises: a first hinge piece comprising a connecting portion; a second hinge piece comprising a first ear and a second ear, the first each and the second ear overlapping the connecting portion along a pivot axis; and an adjuster connecting the first hinge piece with the second hinge piece, wherein the adjuster is configured to adjust a resistance to rotation of the first hinge piece relative to the second hinge piece about the pivot axis by adjusting a clamping force of the first ear and the second ear on the connecting portion.

Illustration 20. The passenger seat headrest of any of the preceding or subsequent illustrations, wherein the adjuster extends outwards from the first ear or the second ear along the pivot axis, and wherein the hinge further comprises a first spacer between the first ear and the connecting portion along the pivot axis and a second spacer between the second ear and the connecting portion along the pivot axis.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat headrest for a passenger seat comprising:
   a main portion;
   a wing; and
   a hinge connecting the wing with the main portion such that the wing is movable relative to the main portion about at least one axis, wherein the hinge is adjustable such that a resistance to rotation of the wing relative to the main portion is adjustable, wherein the hinge comprises:
   a first hinge piece comprising a connecting portion;
   a second hinge piece comprising a first ear overlapping a first end of the connecting portion and a second ear overlapping a second end of the connecting portion, wherein the first ear comprises an aperture and the second ear comprises an anchoring member within the second ear, and wherein either the first ear is a topmost end of the hinge along the at least one axis and the second ear is a bottom-most end of the hinge along the at least one axis, or the first ear is the bottom-most end of the hinge along the at least one axis and the second ear is the topmost end of the hinge along the at least one axis; and an adjuster connecting the first hinge piece with the second hinge piece and defining a pivot axis for the hinge as the at least one axis, wherein the first hinge piece is movable relative to the second hinge piece about the pivot axis, wherein the adjuster extends through the first ear, through the connecting portion, and into engagement with the anchoring member within the second ear.

2. The passenger seat headrest of claim 1, wherein the adjuster comprises a body and a head, wherein the body extends through the first ear and the second portion, and wherein the first ear is on the body of the adjuster between the connecting portion of the first hinge piece and the head of the adjuster.

3. The passenger seat headrest of claim 1, further comprising:
a first spacer between the first ear and the first end of the connecting portion; and
a second spacer between the second ear and the second end of the connecting portion,
wherein the adjuster extends through the first spacer and the second spacer.

4. The passenger seat headrest of claim 1, wherein:
the first hinge piece is connected to the main portion and the second hinge piece is connected to the wing; or
the first hinge piece is connected to the wing and the second hinge piece is connected to the main portion.

5. The passenger seat headrest of claim 1, wherein the hinge is adjustable between a tightened configuration and a loosened configuration.

6. The passenger seat headrest of claim 1, wherein the adjuster extends outwards from the hinge along the at least one axis.

7. The passenger seat headrest of claim 6, wherein the adjuster extends outwards in a downwards direction from the hinge.

8. The passenger seat headrest of claim 1, further comprising a dress cover covering the main portion and the wing, wherein the hinge is adjustable without removing the dress cover from the main portion and the wing.

9. The passenger seat headrest of claim 1, wherein the hinge further comprises a rotation limiter.

10. The passenger seat headrest of claim 1, wherein the adjuster is configured to adjust the resistance to rotation of the wing relative to the main portion by adjusting a clamping force of the first ear and the second ear on the connecting portion.

11. The passenger seat headrest of claim 10, wherein the adjuster extends outwards from the first ear or the second ear along the at least one axis.

12. The passenger seat headrest of claim 10, further comprising a first spacer between the first ear and the connecting portion along the at least one axis and a second spacer between the second ear and the connecting portion along the at least one axis.

13. A passenger seat headrest comprising a hinge, the hinge comprising a first hinge portion connectable to a main portion of the passenger seat headrest and a second hinge portion connectable to a wing of the passenger seat headrest, wherein the second hinge portion is movable relative to the first hinge portion about a pivot axis and comprises a first ear and a second ear overlapping the first hinge portion, wherein the first ear comprises an aperture and the second ear comprises an anchoring member within the second ear, and wherein a resistance to rotation of the second hinge portion relative to the first hinge portion is adjustable, wherein the hinge further comprises an adjuster for adjusting the resistance to rotation, wherein the adjuster extends outwards from the first hinge portion and the second hinge portion along the pivot axis and extends through the first ear, through the first hinge portion, and into engagement with the anchoring member within the second ear, and wherein the hinge further comprises a rotation limiter on at least one of the first hinge portion or the second hinge portion.

14. The passenger seat headrest of claim 13, further comprising the main portion of the passenger seat headrest and the wing portion of the passenger seat headrest.

15. A passenger seat headrest comprising a hinge for connecting a main portion of the passenger seat headrest with a wing portion of the passenger seat headrest, wherein the hinge comprises:
a first hinge piece comprising a single connecting portion;
a second hinge piece comprising a first ear and a second ear, the first ear and the second ear overlapping opposing ends of the single connecting portion along a pivot axis, wherein the first ear comprises an aperture, and wherein the second ear comprises an anchoring member within the second ear; and
an adjuster connecting the first hinge piece with the second hinge piece, wherein the adjuster extends through the aperture in the first ear, through the single connecting portion of the first hinge piece, and into engagement with the anchoring member within the second ear, wherein the adjuster is adjustable relative to the anchoring member to such that adjustment of the adjuster increases or decreases engagement with the anchoring member, and wherein adjustment of the adjuster is configured to adjust a resistance to rotation of the first hinge piece relative to the second hinge piece about the pivot axis by adjusting a clamping force of the first ear and the second ear on the connecting portion.

16. The passenger seat headrest of claim 15, wherein the adjuster extends outwards from the first ear or the second ear along the pivot axis, and wherein the hinge further comprises a first spacer between the first ear and the connecting portion along the pivot axis and a second spacer between the second ear and the connecting portion along the pivot axis.

* * * * *